Dec. 8, 1931. J. C. BUCHANAN 1,835,756
ANTIREVERSE MECHANISM
Filed Feb. 8, 1929 4 Sheets-Sheet 2
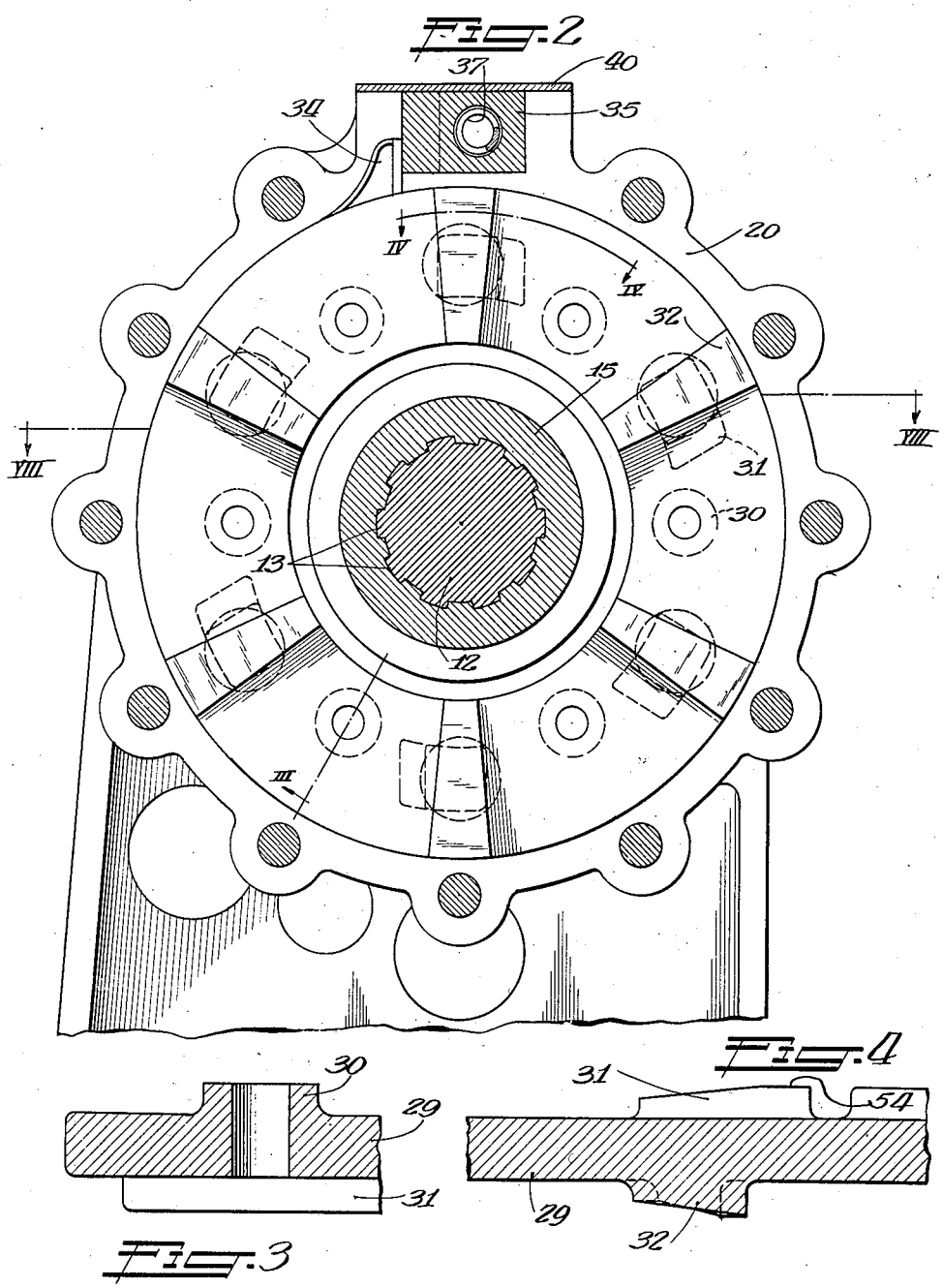
Inventor:
John C. Buchanan,
by Charles W. Niell
Attys.

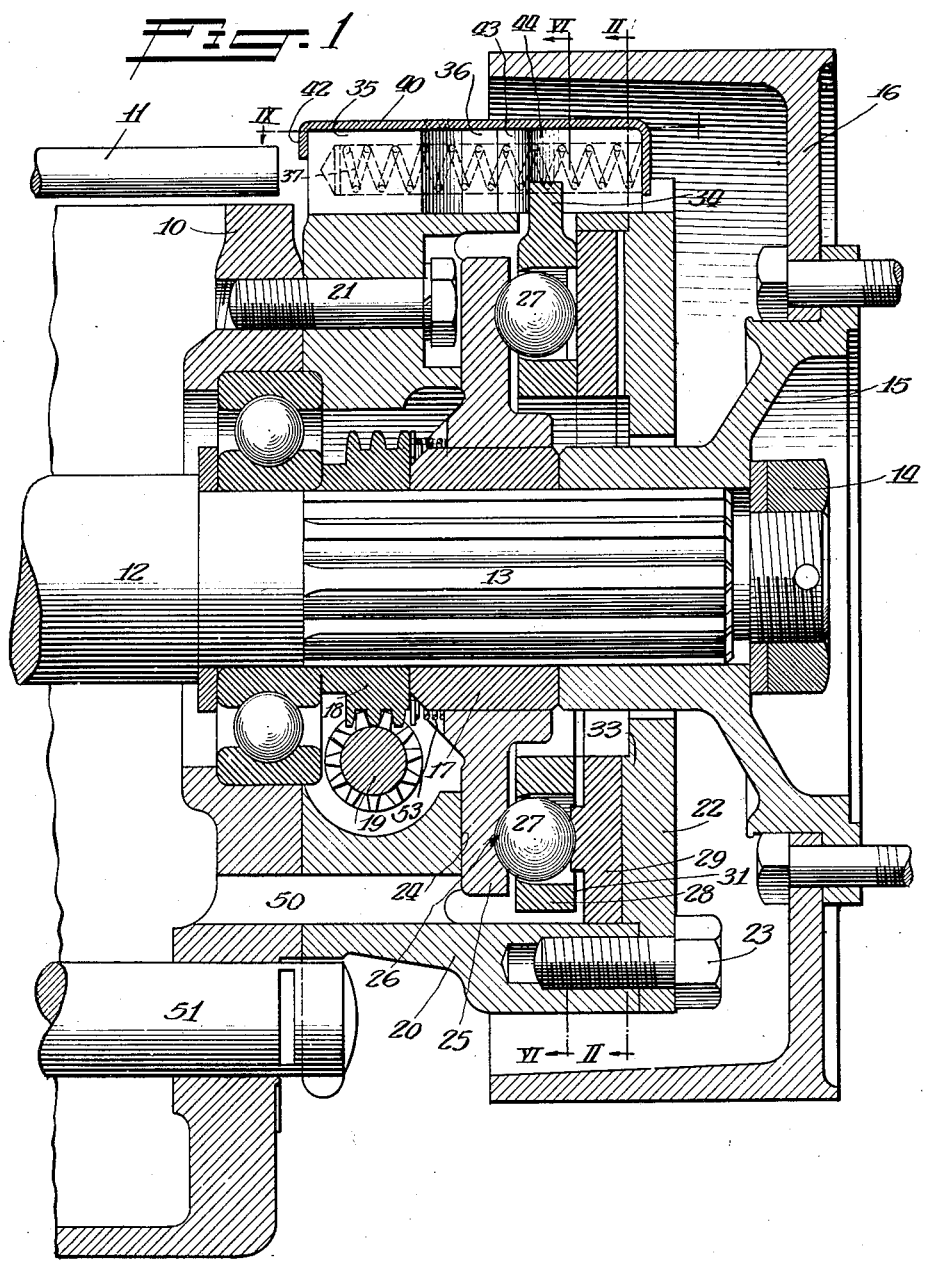

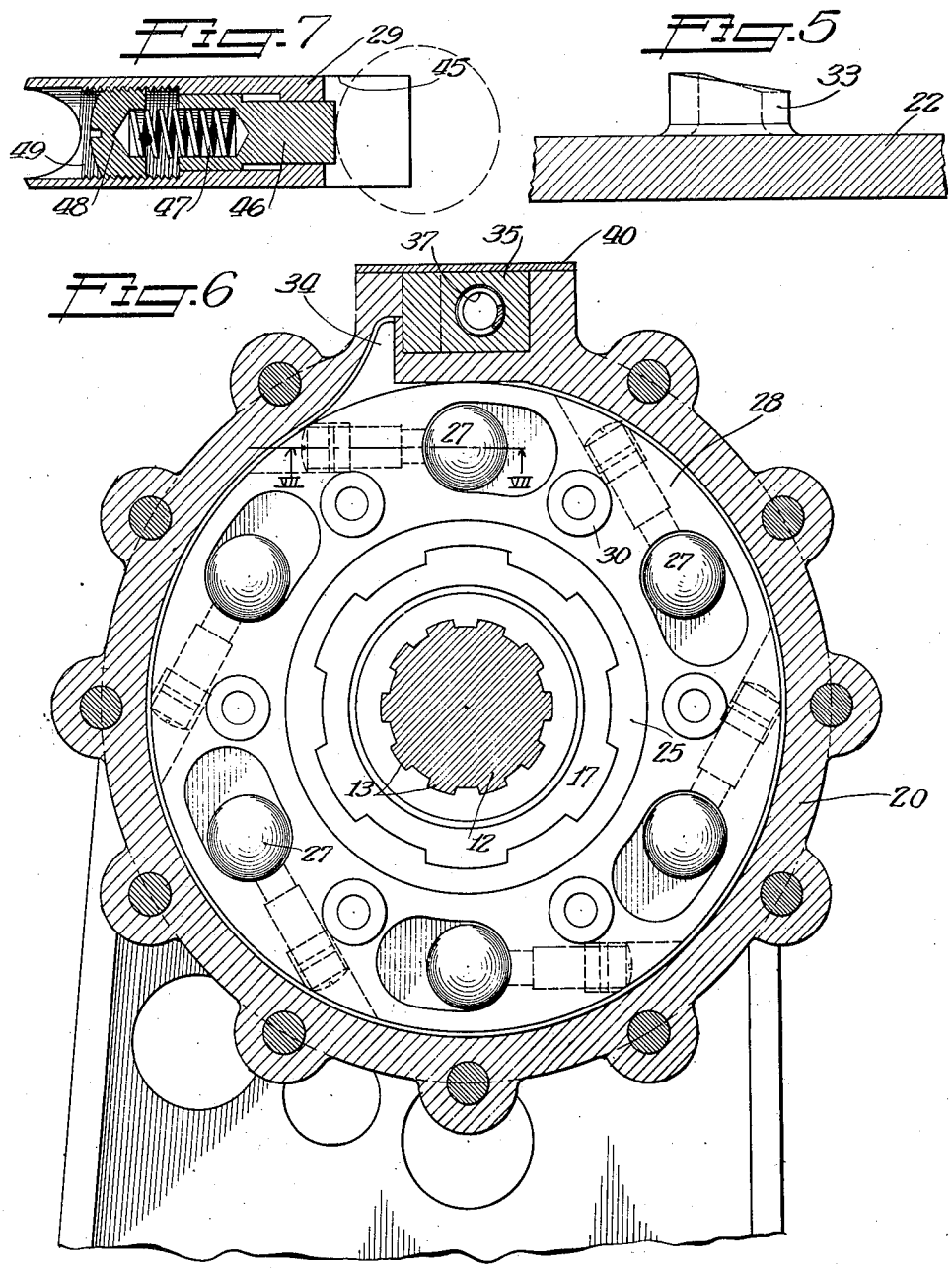

Dec. 8, 1931.  J. C. BUCHANAN  1,835,756
ANTIREVERSE MECHANISM
Filed Feb. 8, 1929  4 Sheets-Sheet 4
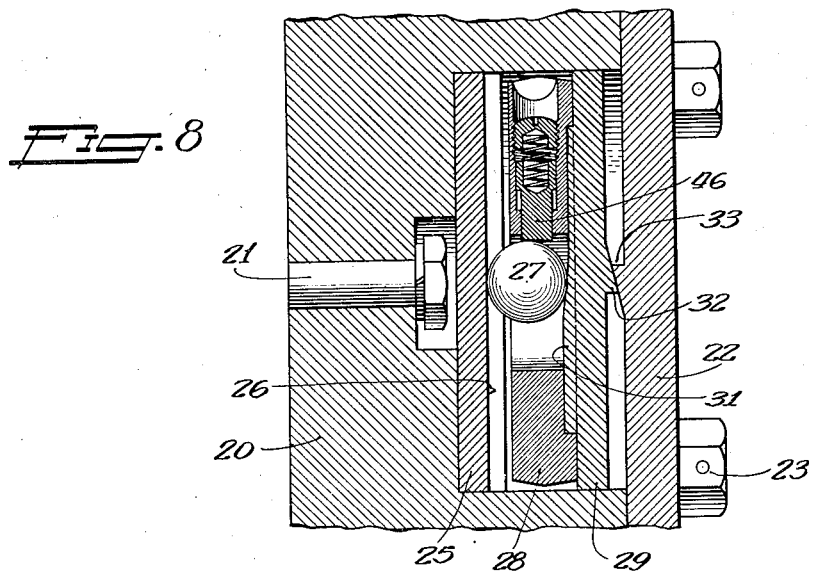
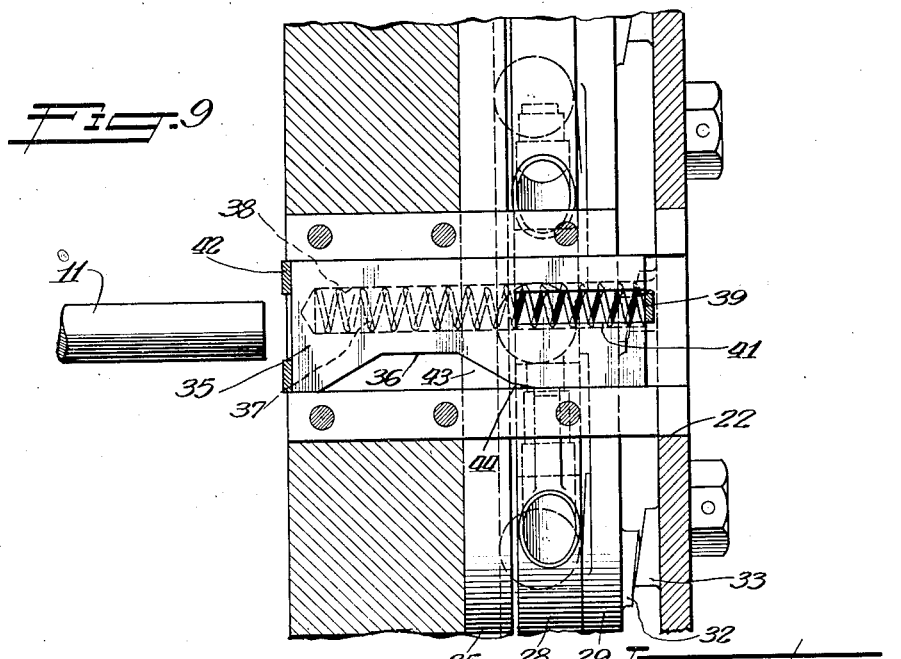
Inventor:
John C. Buchanan.
by Patented Dec. 8, 1931

1,835,756

UNITED STATES PATENT OFFICE

JOHN C. BUCHANAN, OF DETROIT, MICHIGAN, ASSIGNOR TO NORGE CORPORATION, OF DETROIT, MICHIGAN, A CORPORATION OF MICHIGAN

ANTIREVERSE MECHANISM

Application filed February 8, 1929. Serial No. 338,343.

This invention relates to reverse brakes for automotive vehicles and has reference to the provision of improved automatic braking mechanism adapted to prevent a vehicle from rolling backwards when on a grade. When starting a vehicle on an incline it must ordinarily be necessary to hold it with the normal braking system, requiring great skill on the part of the driver to prevent the vehicle from rolling backwards. When the vehicle is equipped with a reverse brake embodying the features of this invention the reverse brake automatically holds the vehicle, leaving the driver free to manipulate the clutch and accelerator in the same manner as when starting on the level.

I am aware that this general type of brake has been proposed heretofore both as a roller or one-way clutch engaging the driving mechanism, and as a one-way band brake applied to either the driving mechanism or directly to the driving wheel. In either case some means must be provided to release or render the brake inactive when it is desired to drive the clutch backwards. My improvements on the prior devices of this character include the provision of a thrust or disc type of one-way clutch readily releasable when desired by retracting the relatively stationary clutching member.

It is accordingly an object of this invention to provide an improved reverse brake to be incorporated in the final drive of an automotive vehicle to automatically lock the same against rotation in the direction opposite to the normal direction of rotation thereof, together with improved means for releasing said brake even when locked, whereby the vehicle may be driven backwards when desired.

It is another object of this invention to provide an improved device that will prevent undesired reverse movement of a vehicle and in which one member of the reverse brake or clutch is adapted to be positively retracted from its operative position by means operated by the movement of the usual gear shift lever to its position engaging the drive for reversing the direction of motion of the vehicle.

It is another object of this invention to provide an improved device of the class described that will be simple and reliable in operation, not subject to wear when not engaged, and adaptable for mounting in connection with existing types of sliding gear transmissions.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal vertical section through a device embodying the features of this invention.

Figure 2 is a vertical cross-section on the line II—II of Figure 1.

Figure 3 is an enlarged fragmentary sectional detail on the line III—III of Figure 2, showing the locking boss.

Figure 4 is an enlarged fragmentary sectional detail on the line IV—IV of Figure 2, showing the inclined bosses on the stationary locking disc.

Figure 5 is a fragmentary sectional detail showing the complementary boss on the casing cover.

Figure 6 is a vertical cross-section on the line VI—VI of Figure 1, showing the ball cage.

Figure 7 is an enlarged fragmentary detail section taken on the line VII—VII of Figure 6, showing the ball engaging plunger.

Figure 8 is a fragmentary cross-section through one of the balls, taken on the line VIII—VIII of Figure 1.

Figure 9 is a fragmentary section on the line IX—IX of Figure 1 with the enclosing casing omitted for the sake of clearness.

As shown on the drawings:

As the particular embodiment of the present invention illustrated on the drawings is intended to be applied to the rear of a vehicle transmission in place of the usual cover, a fragment of the transmission case 10 is shown in Figure 1 together with the rear end of a shifter rod 11 which is commonly used in such transmissions, the rod being shifted backwards when the reverse gearing is engaged. Advantage is taken of the normal movement of this rod to cause it to actuate the releasing mechanism for the reverse brake, as will be brought out in the detailed description which follows.

The usual drive shaft 12 in the transmission projects outboard and is splined at 13 and provided with a threaded end and nut 14 to receive a driving hub 15 for the usual propeller shaft. The hub 15 also carries a transmission brake drum 16. The splines 13 carry an externally splined sleeve 17 and a speedometer driving worm 18 as well as the hub 15, the worm 18 engaging a worm gear 19 which is connected to the speedometer. The sleeve 17 is provided to allow longitudinal movement of the part mounted thereon while the parts on the splines 13 are rigidly locked by the nut 14.

The device of this invention is assembled within an enclosing casing 20 secured to the rear of the transmission casing 10 by bolts 21. The casing 20 is closed by a cover 22 secured thereto by cap screws 23, thus defining a cylindrical space within the casing, the rear wall 24 of which serves an important function as a braking or frictional surface materially reducing the wear on the primary engaging surfaces of the reverse brake. A rotating locking disc 25 is floatingly mounted on the splined sleeve 17 and therefore rotates with the drive shaft 12, the left hand face of the disc engaging the braking surface 24 of the casing while the right hand face carries a ball race groove 26.

A number of balls 27 are held in equally spaced relationship in this groove by a ball retainer disc 28 which in turn is mounted in fixed relationship on a relatively stationary locking disc 29, the disc 28 being bolted to the disc 29 by bolts passing through apertured bosses 30 shown in Figure 3. The locking disc 29 is provided with wedge-like bosses 31 adjacent each ball position so arranged that a reversal of the usual direction of rotation of the disc 25 will cause the balls to mount the inclined wedge-like bosses thus forcing the balls into engagement with the rotating disc 25 and in turn forcing this disc into frictional engagement with the wall 24 of the casing.

If the relatively stationary locking disc 29 and ball retainer disc 28 were rigidly mounted, the assembly so far described would function as a one-way or overrunning clutch. In order to permit release of the clutch when it is desired to move the vehicle backwards, the ball retainer and locking disc is made longitudinally movable relative to the axis of the drive shaft. One way to accomplish this result is to form coacting raised wedge-like inclined surfaces 32 and 33 on the right-hand side of the disc 29 and on the left-hand or inside of the casing cover 22, and to slightly rotate the associated ball retainer and the disc 29 to cause relative movement of the wedge-like surfaces to increase or decrease the space between the disc 29 and the cover, thus moving the stationary disc 29 towards or away from the rotating disc 25. When moved towards the disc 25 the clutch is in operative position and when moved away from the disc 25, the clutch is inoperative as the balls then cannot contact both the ball-races and the bosses 31.

With the arrangement of wedge-like surfaces described it will be apparent that either the disc 29 or the cover 22 may be given the required rotary motion to accomplish the desired longitudinal movement of the disc 29. In the illustrated embodiment the disc 29 is rotated by the thrust of the balls 27 when the drive of the vehicle is reversed. The inclined co-acting surfaces of the relatively stationary disc 29 and the cover 22 being so disposed that the thrust of the balls produces a pressure tending to rotate the disc 29 in a direction that will retract the disc and allow the disc 25 to rotate freely backwards. Under ordinary circumstances the disc 29 is held in the operating position by a lug 34 on the ball retainer disc secured to the disc 29, by a sliding block 35 having a wedge-like recess 36 to receive the lug when the block is pushed back by the rod 10. The wedge-like recess 36 in this block is preferably made up of surfaces having different angles to facilitate the return of the disc to its normal position and to allow the block to be easily pushed out of the way when the device is to be released. This is accomplished by having an abrupt surface 43 to produce the return movement quickly but having the lug rest on a slightly angular surface 44, tending to release it when the device is in operative position, so that a light pressure on the rod 11 will move the block 35. The block is returned to the normal position shown in Figure 8 by a spring 37 in a recess 38 in the block, a lug 39 on a cover 40 projecting through a slot 41 into the recess 38. The cover 40 also carries lugs 42 which limit the return movement of the block, but clear the rod 10.

As the ball retainer disc 28 is stationary while the balls have appreciable oscillatory motion between their disengaged and locked positions, oblong apertures 45 are provided in the retainer disc for the balls and plungers 46 backed by springs 47 and plugs 48 in apertures 49 in the disc are provided to assure that the balls will be urged towards their operative position. Some such provision is especially necessary for those balls on which gravity acts to pull them away from their operative position.

In order to assure copious lubrication of the clutching elements a passage 50 is provided from the transmission case to the chamber in the casing, this passage preferably opening into the transmission case above the countershaft 51 therein as the usual lubricant level in the transmission case is maintained below the top of the countershaft and, hence, lubricant will be splashed into the passage 50 when the transmission gears rotate but will drain back into the transmission when the vehicle is not in use.

The normal operation of this reverse brake resembles that of a one-way or overrunning clutch in that normal forward driving rotation of the transmission driven shaft is not interfered with in any way as the forward rotation of the disc 25 tends to push the balls back against the plungers and into the wider space at what may be termed the foot of the inclined or wedge-like surfaces of the bosses 31 on the relatively stationary disc 29. This wider space is sufficient to relieve the balls of load and at the same time allows the rotating disc 25 to move slightly to the right to reduce or practically eliminate frictional contact with the wall 24 of the casing. This motion to the right to be obtained either by a spring 53 placed between the rotating disc 25 and a flange on the speedometer driving worm 18 or by the natural flow of transmission lubricant that would take place between the rotating disc 25 and the surface 24 of the housing 20 when pressure on the balls 27 was released by forward motion of the vehicle. However, as soon as the forward rotation of the disc 25 ceases the balls are pushed into operative position by the plungers 46, so that the clutch engages before backward motion can be imparted to the disc 25. Thus the clutch functions instantly upon the cessation of forward motion, prior to any reverse motion, or at the exact moment of coming to rest, and this prevents rather than checks reverse motion, preventing a delayed engagement after the vehicle has gained some reverse momentum that would otherwise be taken up with a shock when the reverse brake finally became fully engaged.

When the transmission gear shift is engaged for a reverse drive the gear shifter rod 11 moves backwardly into contact with the block 35 and pushes the block back until the recess 36 therein permits the lug 34 on the ball retainer 28 to move clockwise in Figure 6. This allows the attached disc 29 to rotate under pressure of the balls 27 and varies the relative position of the angular surfaces 32 and 33 between the disc 29 and the casing end cover to permit longitudinal movement of the disc 29 away from the operating position relative to the balls and rotating disc 25.

When the transmission gears are shifted back to neutral or a forward speed the rod 10 moves back to the position shown in Figures 1 and 8, and the block tends to return to its normal position. However, since the elongated holes in the plate 28 allow the balls to move to a certain extent provision is made to allow them to roll completely up the incline on the boss 31 on the relatively stationary disc 29 and onto the flat surface 54 in Fig. 4 when the vehicle is reversed. The balls confined between the rotating disc and the flat surfaces 54 on the relatively stationary disc 29 prevent the forward motion of disc 29 that is necessary to revolve it under pressure of the inclined surface on the block 35 until the vehicle has come to a complete stop and moved slightly forward to revolve disc 25 sufficiently to roll balls off the flat surfaces 54 and down the inclined faces to the normal running position. This is an important safety feature because if the vehicle is rolling backwards with the reverse brake released and the gear shift is thrown into neutral, the lock would otherwise operate suddenly and cause a severe shock.

It will thus be seen that I have invented an improved reverse brake that will be automatic and reliable in action, one that will grip before the vehicle has attained any momentum in the reverse direction, and one that when released by a normal operation of the reverse drive will not re-engage after the reverse drive has ceased, until the vehicle has been driven forwardly for a slight distance, thus permitting intermittent backward coasting when desired.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A reverse brake for automotive vehicles comprising a driving shaft, a rotatable disc secured to said shaft to rotate therewith, a relatively stationary disc having a series of inclined surfaces on the side thereof adjacent the rotatable disc, balls positioned between said inclined surfaces and the rotatable disc and adapted to wedgingly engage therebetween upon a reversal of the rotation of said driving shaft, and means for partially retracting said relatively stationary disc.

2. A reverse brake for automotive vehicles comprising a driving shaft, a rotatable disc secured to said shaft to rotate therewith, a relatively stationary disc having a series of inclined surfaces on the side thereof adjacent the rotatable disc, balls positioned between said inclined surfaces and the rotatable disc and adapted to wedgingly engage therebetween upon a reversal of the rotation of said driving shaft, and means for varying the position of said relatively stationary disc relative to the rotating disc.

3. A reverse brake for automotive vehicles comprising a driving shaft, a casing, a rotatable disc floatingly secured to said shaft to rotate therewith, and adapted in one position to frictionally engage the casing, a relatively stationary disc having a series of inclined surfaces on the side thereof adjacent the rotatable disc, balls positioned between said inclined surfaces and the rotatable disc and adapted to wedgingly engage therebetween upon a reversal of the rotation of said driving shaft, and means for partially retracting said relatively stationary disc.

4. A reverse brake for automotive vehicles comprising a driving shaft, a casing, a rotatable disc floatingly secured to said shaft to rotate therewith, and adapted in one position to frictionally engage the casing, a relatively stationary disc having a series of inclined surfaces on the side thereof adjacent the rotatable disc, balls positioned between said inclined surfaces and the rotatable disc and adapted to wedgingly engage therebetween upon a reversal of the rotation of said driving shaft, and means for varying the position of said relatively stationary disc relative to the rotating disc.

5. A reverse brake for automotive vehicles comprising a driving shaft, a rotatable disc secured to said shaft to rotate therewith, a relatively stationary disc having a series of inclined surfaces on the side thereof adjacent the rotatable disc, balls positioned between said inclined surfaces and the rotatable disc and adapted to wedgingly engage therebetween upon a reversal of the rotation of said driving shaft, means for releasing said brake comprising a support for said relatively stationary disc adapted to permit a helical movement thereof away from said rotatable disc, and means adapted to partially rotate said stationary disc.

6. A reverse brake for automotive vehicles comprising a chambered housing, a driving shaft therein, a disc on said shaft adapted to be movable into frictional engagement with said housing, a second disc spaced from the first disc, clutching means engageable between said discs upon a reverse movement of said drive shaft, and means for varying the spacing between said discs.

7. A reverse brake for automotive vehicles comprising a chambered housing, a driving shaft therein, a disc on said shaft adapted to be movable into frictional engagement with said housing, a second disc spaced from the first disc, clutching means engagable between said discs upon a reverse movement of said drive shaft, and means for shifting said second disc to release said clutching means.

8. A reverse brake for automotive vehicles comprising a chambered housing, a driving shaft therein, a disc on said shaft adapted to be movable into frictional engagement with said housing, a second disc spaced from the first disc, clutching means engageable between said discs upon a reverse movement of said drive shaft, said clutching means being adapted to force said first mentioned disc into frictional engagement with the casing, and means for releasing said clutching means.

9. A reverse brake for automotive vehicles comprising a driving shaft, a movable disc driven by said shaft, a stationary frictional surface adapted to be engaged by said disc, a one-way clutch adapted to force said disc into contact with said frictional surface upon a reversal of the direction of rotation of said shaft, and means adapted to render said one-way clutch inoperative.

10. A reverse brake for automotive vehicles comprising a driving shaft, a movable disc driven by said shaft, a stationary frictional surface adapted to be engaged by said disc, a one-way clutch adapted to force said disc into contact with said frictional surface upon a reversal of the direction of rotation of said shaft, and means adapted to release said clutch when the drive is reversed in direction.

11. A reverse brake for automotive vehicles comprising a driving shaft, a movable disc driven by said shaft, a stationary frictional surface adapted to be engaged by said disc, a one-way clutch adapted to force said disc into contact with said frictional surface upon a reversal of the direction of rotation of said shaft, releasing means for said clutch, and means controlling said releasing means adapted to permit said vehicle to coast backwards until power has again been applied in a forward direction.

12. In combination with a transmission having a reverse speed, a driven shaft extending from said transmission, a reverse brake associated with said driven shaft, control means for releasing said brake upon engagement of said transmission reverse speed, said control means being so formed as to maintain said brake released after disengaging said reverse speed until reset by a forward rotation of the driven shaft.

13. In combination with a transmission having a reverse speed, a driven shaft extending from said transmission, a movable disc driven by said shaft, a stationary frictional surface adapted to be engaged by said disc, a one-way clutch adapted to force said disc into contact with said frictional surface upon a reversal of the direction of rotation of said shaft, control means for releasing said brake upon engagement of said transmission reverse speed, said control means being so formed as to maintain said brake released after disengaging said reverse speed until the driven shaft is again rotated in a forward direction.

14. In combination with a transmission having a reverse speed, a driven shaft extending from said transmission, a movable disc driven by said shaft, a stationary frictional surface adapted to be engaged by said disc, a one-way clutch adapted to force said disc into contact with said frictional surface upon a reversal of the direction of rotation of said shaft, and control means for releasing said clutch upon engagement of said transmission reverse speed.

15. In combination with a transmission having a reverse speed, a driven shafe extending from said transmission, a reverse brake associated with said driven shaft, control means for releasing said brake upon engagement of said transmission reverse speed, said control means being adapted to prevent re-engagement of said reverse brake until reset by a forward rotation of the reverse brake.

In testimony whereof I have hereunto subscribed my name at Detroit, Wayne County, Michigan.

JOHN C. BUCHANAN.